United States Patent [19]

Hill et al.

[11] Patent Number: 5,807,921
[45] Date of Patent: Sep. 15, 1998

[54] SILICONE ELASTOMERS FROM AQUEOUS SILICONE EMULSIONS HAVING IMPROVED ADHESION TO SUBSTRATES

[75] Inventors: Michael Philip Louis Hill; Arthur James Tselepis; Andreas Thomas Franz Wolf, all of Midland, Mich.

[73] Assignee: Dow Corning Corporation, Midland, Mich.

[21] Appl. No.: 576,114

[22] Filed: Dec. 21, 1995

[51] Int. Cl.$^6$ ...................................................... C08L 83/00
[52] U.S. Cl. ............................................................. 524/837
[58] Field of Search ............................................... 524/837

[56] References Cited

U.S. PATENT DOCUMENTS

| | | |
|---|---|---|
| 3,817,894 | 6/1974 | Butler et al. . |
| 4,228,054 | 10/1980 | Ona et al. . |
| 4,412,035 | 10/1983 | Kurita . |
| 4,496,687 | 1/1985 | Okada et al. . |
| 4,535,109 | 8/1985 | Kondo et al. . |
| 4,559,385 | 12/1985 | Huhn et al. ............................. 427/387 |
| 4,600,436 | 7/1986 | Traver et al. . |
| 4,710,405 | 12/1987 | Graiver et al. . |
| 4,877,828 | 10/1989 | Stein et al. . |
| 5,000,861 | 3/1991 | Yang ....................................... 428/391 |

FOREIGN PATENT DOCUMENTS

| | | |
|---|---|---|
| 0572006 | 12/1993 | European Pat. Off. . |
| 0655475 | 5/1995 | European Pat. Off. . |
| 0415254 | 3/1996 | European Pat. Off. . |
| 0739947 | 10/1996 | European Pat. Off. . |
| 58-069250 | 4/1983 | Japan . |
| 58-69250 | 4/1983 | Japan . |
| 2152521 | 8/1985 | United Kingdom . |
| 96/08529 | 3/1996 | WIPO . |
| WO 96/08529 | 3/1996 | WIPO . |

*Primary Examiner*—Melvyn I. Marquis
*Attorney, Agent, or Firm*—Patricia M. Scaduto

[57] ABSTRACT

This invention relates to an aqueous silicone emulsion which forms a silicone elastomer upon the removal of water having improved adhesions to substrates. The silicone emulsion comprises the product form by mixing a diorganosiloxane polymer, water, surfactant, optionally a crosslinker, a tin condensation catalyst, optionally an acid and an effective amount of an aminofunctional siloxane which is formed by reacting an aminofunctional silane and a hydroxy-endblocked organosiloxane.

18 Claims, No Drawings

SILICONE ELASTOMERS FROM AQUEOUS SILICONE EMULSIONS HAVING IMPROVED ADHESION TO SUBSTRATES

BACKGROUND OF THE INVENTION

1. Field of the Invention

This invention relates to an aqueous silicone emulsion which forms a silicone elastomer upon the removal of water having improved adhesion to substrates.

2. Background Information

The literature teaches that aqueous silicone emulsions are dispersions of siloxane polymers in water. Crosslinking of the siloxane polymers may take place either before or after the evaporation of the water although crosslinking prior to the evaporation of water is more common. Upon the evaporation of water, the silicone emulsions produce silicone elastomers in the form of coatings, seals, caulks, etc.

Generally, silicone elastomers from aqueous silicone emulsions have excellent resistance to weathering, moderate high temperature stability and good low temperature properties. In order for these silicone elastomers to have any appreciable mechanical properties, reinforcement of the elastomer is required. This reinforcement may, for instance, be achieved by use of various fillers, including for example, colloidal silica, precipitated silica or fumed silica, or by silica formed in-situ from precursor silicon-containing compounds.

Due to their property profile, silicone elastomers from aqueous silicone emulsions find use as sealants, coatings, caulks and additives and are used widely in building construction. Other ingredients may also be added depending on the specific use in mind, such as thickeners and rheology modifiers, dispersants, pigments, flatting agents, defoamers, adhesion promoters and freeze-thaw stabilizers.

One disadvantage of silicone elastomers from aqueous silicone emulsions is that they tend not to have good adhesion to substrates. Considerable effort has been devoted to finding ways to improve the adhesion of such silicone elastomers as shown in the following patents.

A composition useful as a caulk is described in U.S. Pat. No. 3,817,894. The composition consists essentially of a siloxane copolymer, water, a filler, surfactants and an aminofunctional silane. The aminofunctional silane is stated to function as a crosslinking agent and as curing catalyst for the siloxane copolymer.

An organopolysiloxane latex composition crosslinked by organofunctional trialkoxysilanes is useful for binding glass fibers as disclosed in U.S. Pat. No. 4,228,054. The composition is prepared by dissolving a surfactant in water, adding a cyclic organosiloxane and the organofunctional trialkoxysilane, then emulsifying and heating to obtain a high molecular weight organopolysiloxane, which is cooled and neutralized to give the product.

Japanese Kokai Publication No. 83-69250, published Apr. 25, 1983, describes a silicone aqueous emulsion composition which consists of (A) an anionic silicone emulsion, (B) a homogeneous dispersion of amino-functional silane or partial hydrolyzate and colloidal silica, and (C) a curing catalyst. The aminofunctional silane is of the formula R"Si(OR')$_{4-n}$ where R" is amino-functional, R' is an alkyl, acyl, etc. group, and n is 1, 2, 3, or 4.

U.S. Pat. No. 4,496,687, describes an organopolysiloxane-containing aqueous emulsion composition prepared by blending (A) an aqueous emulsion of an organopolysiloxane having silicon-bonded hydroxy groups and emulsified in water by use of an anionic surface active agent, (B) a mixture of a reaction product of a carboxylic acid anhydride with an amino-functional organosilane and a colloidal silica in the form of an aqueous emulsion and (C) a curing catalyst. The composition is stated to be very stable and storable over a long period of time. It cures into a rubbery elastomer having good adhesion to the surface of the substrate on which it is dried and cured.

U.S. Pat. No. 4,412,035, relates to a silicone cationic emulsion composition of a polydiorganosiloxane containing amino, epoxy, and hydroxy groups as functional groups, and which may be used as a releasing agent, stripping agent, paint component, and anti-foaming agent. A reaction product of a silanol containing polydiorganosiloxane, an amine functional silane, and an epoxy functional silane is emulsion polymerized with a cyclic siloxane, a quaternary ammonium salt surfactant and water.

British patent application No. 2,152,521 A, published Aug. 7, 1985, disclosed a method for producing aminoalkyl-siloxane polymers of high molecular weight by hydrolyzing a difunctional aminoalkylsilane prior to reaction with hydroxy-terminated siloxane oligomers.

U.S. Pat. No. 4,535,109, describes a method of producing silicone aqueous emulsion compositions of polydiorganosiloxane, colloidal silica, curing catalyst, emulsifier, and water. After a period of ripening, an amino-functional silane or its partial hydrolyzate is added to give superior gloss, good adhesion to substrates, and a rustproof coating.

U.S. Pat. No. 4,710,405 teaches a method of improving adhesion of silicone elastomers from aqueous emulsions, comprising mixing an anionically stabilized polydiorganosiloxane emulsion with an amine functional polydiorganosiloxane co-oligomer of the formula

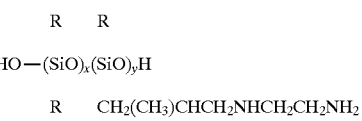

where, R is a monovalent alkyl radical from 1 to 6 carbon atoms, x is from 1 to 250 and y is from 2 to 50, applying the mixture to a substrate and allowing it to dry.

U.S. Pat. No. 4,877,828 teaches the use of bissilyl ureas in silicone latex caulk compositions to improve adhesion.

Although these methods may result in better adhesive properties for the silicone elastomer, problems still exist. One problem arises because adding neat aminofunctional silanes to silicone emulsions tend to destabilize the emulsion resulting in poor shelf life, agglomeration or coagulation. In addition, the improvements in adhesion obtained by addition of neat aminofunctional silanes are not maintained over a period of more than 2 to 6 weeks since condensation of the hydrolyzed adhesion promoter causes it to deactivate.

One objective of this invention is to prepare an aqueous silicone emulsion which forms a silicone elastomer upon the removal of water having improved adhesion to substrates. Another objective is to prepare an aqueous silicone emulsion having an improved shelf life while in emulsion form, which forms a silicone elastomer upon the removal of water. Another objective is to maintain the improvements of adhesion attained over an extended period of the (wet) shelf life of the silicone emulsion.

SUMMARY OF INVENTION

The objectives of this invention can be achieved by preparing an aqueous silicone emulsion which forms a silicone elastomer upon the removal of water having improved adhesion to substrates. The silicone emulsion comprises the product formed by mixing a diorganosiloxane polymer, water, surfactant, optionally a crosslinker, a tin condensation catalyst, an effective amount of an aminofunctional siloxane which is formed by reacting components comprising an aminofunctional silane and a hydroxy-endblocked organosiloxane and optionally an acid.

DETAILED DESCRIPTION OF THE INVENTION

This invention relates to an aqueous silicone emulsion, the silicone emulsion comprising the product formed by mixing:

(A) a diorganosiloxane polymer having the general formula (I)

$$X_{3-n}R_n\text{—}YO\text{—}(R^1{}_2SiO)_z\text{—}Y\text{—}R_nX_{3-n}$$

where
n is 0, 1, 2 or 3,
z is an integer from 200 to 10,000,
X is a hydroxyl group or any hydrolyzable group,
R is individually selected from the group consisting of substituted and unsubstituted monovalent hydrocarbon radicals having from 1–15 carbon atoms,
$R^1$ is individually selected from the group consisting of X groups and R groups, provided, at least 90% of the $R^1$ groups are R groups, and
Y is a Si atom, a —Si—$(CH_2)_m SiR^1{}_2$— group or a —Si—$(CH_2)_m SiR^1{}_2$—O—$SiR^1{}_2$—$(CH_2)_m SiR^1{}_2$— group, where $R^1$ is defined above and m is a positive integer;

(B) water;
(C) a surfactant;
(D) optionally, a crosslinker;
(E) a tin condensation catalyst;
(F) an effective amount of an aminofunctional siloxane which is formed by reacting components comprising an aminofunctional silane (II) having the formula

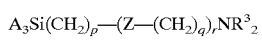

$$A_3Si(CH_2)_p\text{—}(Z\text{—}(CH_2)_q)_r NR^3{}_2$$

where, A is a hydrolyzable group, Z is an oxygen atom or $NR^2$, where $R^2$ is individually selected from the group consisting of hydrogen and substituted and unsubstituted monovalent hydrocarbon radicals having from 1–15 carbon atoms, $R_3$ is individually selected from the group consisting of hydrogen and substituted and unsubstituted monovalent hydrocarbon radicals having from 1–15 carbon atoms, p and q are each a positive integer from 2 to 10 and r is a positive integer from 0 to 3; and a hydroxy-endblocked organosiloxane (III) having the formula

$$HO\text{—}(SiR^4{}_2)_b\text{—}OH$$

where $R_4$ is individually selected from the group consisting of substituted and unsubstituted monovalent hydrocarbon radicals having from 1–15 carbon atoms and b is a positive integer from 4 to 80; and (G) optionally, an acid.

Component (A) is a diorganosiloxane polymer. The term "diorganosiloxane polymer" as used herein comprises siloxane compositions having mixtures of various types of siloxane polymers as well as compositions having only a single type of siloxane polymer. The diorganosiloxane polymer can also be a homopolymer, copolymer and terpolymer. In addition, the term includes different kinds of molecules, such as long chain linear or branched molecules and short chain linear or branched molecules. Although not critical to this invention, the viscosity of the organosiloxane polymer should be in the range of 5,000 to 500,000 MPa. s, and preferably in the range of 10,000 to 100,000 Mpa. s, however, higher molecular weight polymers can be used if the viscosity is adjusted using solvent, polymer blending etc.

The compositions included under the term "diorganosiloxane polymer" and used in the present invention are well known to those skilled in the art. The diorganosiloxane polymers useful in the present invention can be described by formula (I) provided above and are either commercially available or can be made by known methods.

Substituent X represents one or more groups bonded to a silicon atom and can be a hydroxyl group or a hydrolyzable group. Hydrolyzable groups include any group attached to silicon which is hydrolyzed by water at room temperature. Suitable hydrolyzable groups that can be represented by X include but are not limited to hydrogen; halogen atoms such as chlorine, bromine, fluorine or iodine; groups of the formula —OT when T is any hydrocarbon or halogenated hydrocarbon group such as methyl, ethyl, iso-propyl, octadecyl, allyl, hexenyl, cyclohexyl, phenyl, benzyl, beta-phenylether, 2-chloroethyl, chlorophenyl, 3,3,3-trifluoropropyl, or bromocyclohexyl; any hydrocarbon ether radical such as 2-methoxyethyl, 2-ethoxyisopropyl, 2-butoxyisobutyl, p-methoxyphenyl or —$(CH_2CH_2O)_2CH_3$; any acyl radical such as acetyl, propionyl, benzoyl, cyclohexoyl, acrylyl, methacrylyl, stearyl, naphthoyl, trifluoroacetyl, chlorobenzoyl or bromopropionyl; any acyloxy group such as acetoxy, benzoyloxy, propionoxy, or acryloxy; or any amino radical such as $NH_2$, dimethylamino, diethylamino, ethylmethylamino, diphenylamino, methylphenylamino or dicyclohexylamino. X can also be any aminoxy radical of the formula —$ONT_2$ or —ONT' in which T is as defined above and T' is any divalent hydrocarbon radical both valences of which are attached to the carbon, such as hexylene, pentylene or octylene; any ketoxime radical of the formula —ON=$CT_2$ or —ON=CT' in which T and T' are defined above; ureido groups of the formula —N(T)CONT"$_2$ in which T is defined above and T" is H or any of the T radicals; carbamate groups of the formula —OOCNTT" in which T and T" are defined above; or carboxylic amide radicals of the formula —NTC=O(T") in which T and T" are defined above. X can also be the sulfate group or the sulfate ester groups of the formula —$OSO_2$(OT) where T is as defined above; the cyano group; the isocyanate group; and the phosphate or phosphate ester groups of the formula —$OPO(OT)_2$ where T is as defined above.

Hydroxyl groups and alkoxy groups are preferred groups for X. Illustrative examples of alkoxy groups are methoxy, ethoxy, propoxy, isobutoxy, pentoxy, hexoxy, 2-ethylhexoxy and the like. The more preferred group for X is the hydroxyl group.

Substituents R and $R^1$ each represent substituted or unsubstituted monovalent hydrocarbon groups having from 1–15 carbon atoms bonded to a silicon atom which may or may not be identical, provided at least 90% of the $R^1$ groups are unsubstituted monovalent hydrocarbon radicals having from 1–15 carbon atoms. Examples of suitable substituted and unsubstituted monovalent hydrocarbon radicals that can be represented by R and $R^1$ include but are not limited to alkyl radicals such as methyl, ethyl, isopropyl, hexyl, octadecyl or myricyl; alkenyl radicals such as vinyl, allyl or hexenyl; alkynal radicals such as propargyl, cycloaliphatic radicals such as cyclopentyl, cyclohexyl or cyclohexenyl; aromatic hydrocarbons such as phenyl, tolyl, xylyl, xenyl, naphthyl or anthracyl; aralkyl hydrocarbon radicals such as benzyl, beta-phenylethyl, beta-phenylpropyl or gamma-tolylpropyl; and halogenated hydrocarbon or carbon radicals such as 3,3,3-trifluoropropyl, tridecafluoro-1,1,2,2-tetrahydrooctyl)-1-methyl or perfluoroalkyl. In addition, $R^1$ may be an X group.

R and $R^1$ are preferably methyl groups or methyl and phenyl groups. More preferably both R and $R^1$ are methyl groups.

Substituent Y represents a single silicon atom (Si) or groups which include methylene spacer groups attached to silicon, having the formula —Si—$(CH_2)_m SiR^1_2$— or —Si—$(CH_2)_m SiR^1_2$—O—$SiR^1_2$—$(CH_2)_m SiR^1_2$—, where $R^1$ is defined above and m is a positive integer. Y is more preferably a silicon atom for this invention.

The diorganosiloxane polymers can be present as a mixture of different diorganosiloxane polymers so long as there is on average at least 1.3 hydroxyl or hydrolyzable groups or a mixture thereof per diorganosiloxane polymer molecule. Preferably, there should be on average at least 1.6 hydroxyl or hydrolyzable groups or a mixture thereof per diorganosiloxane polymer molecule and most preferably there should be on average at least 2 hydroxyl or hydrolyzable groups or a mixture thereof per diorganosiloxane polymer molecule. The diorganosiloxane polymers which are present as a mixture can be prepared by mixing the individual diorganosiloxane polymers prior to emulsification or by emulsifying them individually and then mixing the emulsions.

Preferred diorganosiloxane polymers include hydroxyl endblocked polydimethylsiloxane (PDMS) polymers, ethylene trialkoxysilyl endblocked PDMS polymers and ethylene dialkoxyalkylsilyl endblocked PDMS polymers, where preferred alkoxy groups include methoxy and ethoxy and a preferred alkyl group is methyl. Hydroxyl endblocked PDMS polymer is the more preferred diorganosiloxane polymer.

Component (B) is water. The silicone emulsion is in the form of an oil-in-water emulsion such that the diorganosiloxane polymers comprise a dispersed phase and water comprises a continuous phase. The water is usually present in the amount of about 8 to 1000 parts by weight based on 100 parts of the diorganosiloxane polymer. Preferably, the water is present in the amount of about 15 to 50 parts by weight based on 100 parts of the diorganosiloxane polymer. The water does not need to be added in one amount and the amounts can be added at varying points of the compounding process as desired. For example, in a preferred method using direct emulsification, a small amount of water, for example 2 to 5 parts by weight based on 100 parts by weight diorganosiloxane polymer, is used to emulsify the diorganosiloxane and other components, as desired, and then the resulting emulsion is diluted with additional water to the desired polymer solids content.

Component (C) is a surfactant. The term "surfactant" is meant to describe a surface active agent selected from cationic surfactants, anionic surfactants, amphoteric surfactants, nonionic surfactants and mixtures thereof which stabilizes the dispersed phase of the emulsion. Each of these types of surfactants which are known in the art as being useful in stabilizing emulsions of diorganosiloxane polymers, whether individually or combined with another type of surfactant, is also useful as a surfactant in the instant invention Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of disubstituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable anionic surfactants include, but are not limited to sulfonic acids and their salt derivatives such as described in U.S. Pat. No. 3,294,725 to Findley et al., which patent is hereby incorporated by reference. These anionic surfactants can be exemplified by, but are not limited to, alkali metal sulforicinates; sulfonated glycerol esters of fatty acids such as sulfonated monoglycerides of coconut oil acids; salts of sulfonated monovalent alcohol esters such as sodium oleylisethionate; amides of amino sulfonic acids such as the sodium salt of oleyl methyl tauride; sulfonated products of fatty acids nitriles such as palmitonitrile sulfonate; sulfonated aromatic hydrocarbons such as sodium alphanaphthalene monosulfonate and dibutyldodecylbenzenesulfonate (DBSA); condensation products of naphthalene sulfonic acids with formaldehyde; sodium octahydroanthracene sulfonate; alkali metal alkyl sulfates, such as sodium lauryl sulfate; ether sulfates having alkyl groups of 8 or more carbon atoms, alkylarylsulfonates having 1 or more alkyl groups of 8 or more carbon atoms and dialkylsulfonates, each alkyl group having 8 or more carbon atoms, such as dioctyl sulfosuccinate.

Suitable amphoteric surfactants include, but are not limited to, lecithin, glycinates, betaines, sultaines and alkyl aminopropionates. These can be exemplified by cocoamphglycinate, coco-amphocarboxyglycinates, cocoamidopropylbetaine, lauryl betaine, cocoamidopropydroxy-sultaine, laurylsulataine, and cocoamphodipropionate.

Useful nonionic surfactants may be exemplified, but not limited to, polyoxyalkylene alkyl ethers, polyoxyalkylene sorbitan esters, polyoxyalkylene esters, polyoxyalkylene alkylphenyl ethers, ethoxylated amides, ethoxylated siloxanes, block copolymers of propylene oxide and ethylene oxide and others.

Anionic surfactants and nonionic surfactants are preferred. Nonionic surfactants such as polyoxyalkylene alkyl ethers, including Tergitol® TMN-6, Tergitol® TMN-10 and Triton® X-100 and mixtures of anionic surfactants such as dioctyl sulfosuccinates and nonionic surfactants are more preferred.

Generally, the amount of surfactant used should be that amount which stabilizes the dispersed phase of the silicone emulsion. An amount from 0.1 to 10 parts by weight based on 100 parts by weight diorganosiloxane polymer should be sufficient. Preferably, the surfactant is present in an amount from 0.5 to 5 parts by weight based on 100 parts by weight diorganosiloxane polymer. More preferably, the surfactant is present in an amount from 1.5 to 5 parts by weight based on 100 parts by weight diorganosiloxane polymer.

Component (D) is a crosslinker. This ingredient is optional depending on the composition of the diorganosiloxane polymer. When the diorganosiloxane polymer has an average of more than 1.3 condensable or hydrolyzable groups per molecule, it is not necessary to have a crosslinker present in order to crosslink the diorganosiloxane polymers. The condensable or hydrolyzable groups on different diorganosiloxane polymer molecules can react with each other to form the crosslinked rubber particles which dry to a silicone elastomer upon the removal of water from the silicone emulsion. Even though a crosslinker is not required, it may be desirable to use one as can be determined by the person skilled in the art.

When the diorganosiloxane polymer does not on average have more than 1.3 hydrolyzable or condensable groups, a crosslinker must be added to form the crosslinked rubber particles which dry to a silicone elastomer upon the removal of water from the silicone emulsion.

Typically, the crosslinker is an organosilicon compound or a resin which contains on average per molecule, more than 2 hydrolyzable groups or hydroxyl groups bonded to a silicon atom. The hydrolyzable groups useful for the crosslinker are the same as those described earlier for substituent X of the diorganosiloxane polymer.

As long as the crosslinker contains on average per molecule, more than 2 hydrolyzable groups or hydroxyl groups bonded to silicon and preferably at least 3 of these groups bonded to silicon, depending on the groups bonded to the dioganosiloxane polymers, other types of groups may also be bonded to the silicon. The molecular structure of the crosslinker is a silane or siloxane structure. In addition, the siloxane type crosslinkers may be straight chain, branched chain or cyclics. Examples of the groups other than hydrolyzable groups which can be attached to the silicon atoms of the crosslinker, include hydrogen and the monovalent substituted and unsubstituted hydrocarbon groups described earlier for R.

In essence, any crosslinker known for crosslinking aqueous silicone emulsions in the presence of a tin condensation catalyst may be used in this invention such as colloidal silica, alkali silicates, alkali siliconates, alkoxysilanes, alkenoxysilanes, oximosilanes, silazanes, aminoxysilanes, silicone resins and silicone hydrides. Examples of specific crosslinkers include, but are not limited to low molecular weight organosilicon hydrides, such as polymethylhydrogensiloxane, low molecular weight copolymers containing methylhydrogensiloxy and dimethylsiloxy groups, —(OSi(OEt)$_2$—, ethylpolysilicate, (OSiMeC$_2$H$_4$Si(OMe)$_3$)$_4$, (OSi—ON=CR'$_2$)$_4$, methyltrimethoxysilane, methyltripropenoxysilane, tetraethylorthosilicate, isobutyltrimethoxysilane, ethyltriacetoxysilane, methyltriacetoxysilane, vinyltriacetoxysilane, vinyltrioximosilane and Me$_3$SiO(Me$_2$SiO)$_3$(Me(ON(Et)$_2$SiO)$_5$SiMe$_3$, in each case where Me is methyl and Et is ethyl.

Preferred crosslinkers are silanes having at least three alkoxy groups. More preferred is when each alkoxy group has up to 8 carbon atoms. Most preferred is when each alkoxy group has up to 3 carbon atoms such as methyltrimethoxysilane, isobutyltrimethoxysilane, methyltriethoxysilane, methyltripropenoxysilane and chloropropyltrimethoxysilane.

Generally, the crosslinker when used in the invention is added in amount from about 0.1 to 50 parts by weight based on 100 parts by weight diorganosiloxane polymer. Preferably, about 1 to 10 parts by weight based on 100 parts by weight diorganosiloxane polymer is added with about 2 to 5 parts by weight based on 100 parts by weight diorganosiloxane polymer being more preferred.

The crosslinker may be added as a single species or as a mixture of two or more different species. The crosslinkers may be added before or after emulsification. For ease of compounding, however, it is preferred to add the crosslinker prior to emulsification.

Component (E) is a tin condensation catalyst. The tin condensation catalyst serves to accelerate the crosslinking reaction between diorganosiloxane polymers if they contain sufficient hydrolyzable groups or more typically, between a diorganosiloxane polymer and a crosslinker. The tin condensation catalyst is an organotin compound having a valency of +4 such as stannic tin (IV) compounds or a mixture of a tin (IV) and an organotin compound having a valency of +2 such as stannous tin (II) compounds. Stannic tin (IV) compounds are preferred. Examples of stannous tin compounds include organic stannous carboxylates such as stannous oleate, stannous octoate and stannous neodecanoate. Examples of the stannic tin compounds include tin stannoxanes such as ((C$_4$H$_7$)$_2$SnCl)$_2$O and (C$_4$H$_7$)$_2$Sn(Cl)—OSn(OH) (C$_4$H$_7$)$_2$ and stannic carboxylates having the formula R'$_2$Sn(OCOR")$_2$, where each R' is individually selected from monovalent alkyl radicals having from 1 to 18 carbon atoms and R" is individually selected from the group consisting of R' and —CH$_2$COR', where R' is defined above. The tin catalyst can also be the reaction product of R'$_2$SnO with (a) R'$_2$Sn(OCOR')$_2$; (b) R'$_2$Sn(OCOR')2 and a dicarboxylic acid anhydride; (c) a carboxylic acid; (d) secondary amines or N-acylated amino acids; (e) R'$_s$Sn(SR')$_{4-s}$, where s is 1, 2 or 3; and (f) a carboxylic acid, an alcohol or an alcohol amine. The tin (IV) compound can also have the formulae R'$_2$DSn(OSnR'$_2$)$_c$—D or R'$_2$SnD$_2$, where R' is as defined above, D is a dicarboxylic acid monoester and c is a positive integer from 1 to 10; M-SnR'$_2$ —(OSnR'2)$_x$—M, where M is an alkoxy group or other radical capable of forming coordinative bonds with tin and x is a positive integer from 1 to 10; or R'$_2$Sn(OSiR'$_3$)$_2$.

Substituent R' is a monovalent alkyl group having from 1 to 18 carbon atoms. Examples of R' include but are not limited to methyl, ethyl, propyl, hexyl, dodecyl and octadecyl.

Substituent D is a dicarboxylic acid monoester such as ethyloxolate.

Substituent M is an alkoxy group or other radical capable of coordinating with tin, such as acetylacetonate.

The stannic carboxylates are the more preferred tin condensation catalysts, with dibutyltindiacetate being most preferred.

It may be desirable to reduce the amount of the tin (IV) catalyst in the silicone emulsion. This can be achieved by using known co-catalysts such as carboxylic acids or amines or salts of carboxylic acids or amines as described by Chu, H. K., Cross, R. P., Crossan, D. I., *J. Organomet. Chem.*, 1992, 425, 9–17.

Generally, the tin condensation catalyst is added in an amount from about 0.01 to 5 parts by weight based on 100 parts by weight diorganosiloxane polymer. Preferably, the tin condensation catalyst is added in an amount from about 0.05 to 2 parts by weight based on 100 parts by weight diorganosiloxane polymer, with an amount from about 0.06 to 0.5 parts by weight based on 100 parts by weight diorganosiloxane polymer being more preferred.

The tin condensation catalyst may be added as a single species or as a mixture of two or more different species. The tin condensation catalyst may be added before or after emulsification. For ease of compounding, however, it is preferred to add the tin condensation catalyst prior to emulsification.

Component (F) is an aminofunctional siloxane which is formed by reacting components comprising an aminofunctional silane (II) having the formula $A_3Si(CH_2)_p$—$(Z$—$(CH_2)_q)_rNR^3_2$ with a hydroxy-endblocked organosiloxane (III) having the formula HO—$(SiR^4_2)_b$—OH. Both the aminofunctional silanes and the hydroxy-endblocked organosiloxanes are commercially available or can be prepared by known methods.

Substituent A is a hydrolyzable group. Hydrolyzable groups include any group attached to silicon which is hydrolyzed by water at room temperature. Suitable hydrolyzable groups that can be represented by A include those hydrolyzable groups described for X.

Substituent A is preferably an alkoxy group and more preferably an alkoxy group having up to 8 carbon atoms. Illustrative examples of alkoxy groups are methoxy, ethoxy, propoxy, isobutoxy, pentoxy, hexoxy, 2-ethylhexoxy and the like. It is most preferred for A to be an alkoxy group having up to 3 carbon atoms.

Substituent Z is an oxygen atom or $NR^2$, where $R^2$ is individually selected from the group consisting of hydrogen and substituted and unsubstituted monovalent hydrocarbon radicals having from 1–15 carbon atoms. Substituent Z is preferably $NR^2$. Examples of the substituted and unsubstituted monovalent hydrocarbon radicals of $R^2$ are the same as described for substituent R. Preferably, $R^2$ is hydrogen.

Subscript p is a positive integer from 2 to 10, preferably from 2 to 6, and most preferably 3.

Subscript q is a positive integer from 2 to 10, preferably from 2 to 6, and most preferably 2.

Subscript r is a positive integer from 0 to 3, preferably from 0 to 2, and most preferably 0 or 1.

Substituent $R^3$ is individually selected from the group consisting of substituted and unsubstituted monovalent hydrocarbon radicals having from 1 to 15 carbon atoms. Examples of these substituted and unsubstituted monovalent hydrocarbon radicals are the same as provided above for substituent R. In addition, substituent $R^3$ can be a hydrogen atom. $R^3$ is preferably a hydrogen atom.

Examples of the aminofunctional silanes include but are not limited to: $(CH_3O)_3Si$—$(CH_2)_3$—$NH_2$, $(C_2H_5O)_3Si$—$(CH_2)_3$—$NH_2$, $(CH_3O)_3Si$—$(CH_2)_3$—$NH$—$(CH_2)_2$—$NH_2$, $(CH_3O)_3Si$—$(CH_2)_3$—$O$—$(CH_2)_2$—$NH_2$, $(CH_3O)_3Si$—$(CH_2)_3$—$NH$—$(CH_2)_6$—$NH_2$, $(C_2H_5O)_3Si$—$(CH_2)_3$—$NH$—$(CH_2)_3$—$NH_2$ $(CH_3O)_3Si$—$(CH_2)_4$—$NH$—$(CH_2)_2$—$NH$—$(CH_2)_2$—$NH$—$(CH_2)_2$—$NH$—$(CH_2)_2$—$NH2$ and $(CH_3O)_3Si$—$(CH_2)_3$—$NH$—$(CH_2)_2$—$N(CH_3)_2$. Preferred aminofunctional silanes are those containing primary amino groups with $(CH_3O)_3Si$—$(CH_2)_3$—$NH$—$(CH_2)_2$—$NH_2$, $(C_2H_5O)_3Si$—$(CH_2)_3$—$NH_2$, $(CH_3O)_3Si$—$(CH_2)_3$—$NH_2$ and $(CH_3O)_3Si$—$(CH_2)_3$—$NH$—$(CH_2)_6$—$NH_2$ being more preferred.

The aminofunctional silane is mixed with a hydroxy-endblocked organosiloxane (III) having the formula HO—$(SiR^4_2)_b$—OH to form the aminofunctional siloxane.

$R^4$ is individually selected from the group consisting of substituted and unsubstituted monovalent hydrocarbon radicals having from 1–15 carbon atoms. Examples of these substituted and unsubstituted monovalent hydrocarbon radicals are the same as provided above for substituent R. Preferably, each $R^4$ is methyl.

Subscript b represents the degree of polymerization in the hydroxy-endblocked organosiloxane and can be from 4 to 80. Preferably b is 4 to 50 and more preferably, b is 6 to 20.

Short chain hydroxy endblocked organosiloxanes are preferred over those having a longer chain because an effective concentration of amino functionality can be obtained at a lower addition level of aminofunctional siloxane when short chains are used. The optimum chain length and nature of the hydroxy endblocked organosiloxane is further determined by other parameters. One key parameter is the compatibility of the aminofunctional siloxane with the diorganosiloxane polymer and other components of the emulsion. Compatibility with the diorganosiloxane polymer improves with the increasing chain length of the hydroxy-endblocked organosiloxane and with chemical similarity of the various R substituents. For instance if the diorganosiloxane is substantially a PDMS polymer, it may be desirable to use a short chain PDMS for improved compatibility. Compatibility is important because it controls the partitioning of the aminofunctional siloxane between the water phase and the dispersed phase comprising the diorganosiloxane polymer.

In a preferred embodiment, the aminofunctional siloxane is formed by reacting components comprising an aminofunctional silane (II), a hydroxy-endblocked organosiloxane (III) and a silane (IV) having the formula $R^5_cSiG_{4-c}$. The silane is commercially available or can be prepared by known methods.

Substituent $R^5$ is individually selected from the group consisting of substituted and unsubstituted monovalent hydrocarbon radicals having from 1–15 carbon atoms. Examples of these substituted and unsubstituted monovalent hydrocarbon radicals are the same as provided above for substituent R. The preferred $R^5$ radical is methyl.

Substituent G is a hydrolyzable group. Examples of the hydrolyzable groups useful for the invention are the same as described for X. Substituent G is preferably an alkoxy group and more preferably a methoxy or an ethoxy group.

Subscript c can be 0, 1 or 2. Preferably, c is 0 or 1 and more preferably c is 1.

Examples of the silane (IV), include but are not limited to the examples provided above for the crosslinker as well as dimethyldimethoxysilane, dimethyldiethoxysilane, ethylmethyldimethoxysilane and diisobutyldimethoxysilane. Preferably the silane is an alkoxy silane with methyltrimethoxysilane and methyltriethoxysilane being more preferable and methyltrimethoxysilane being most preferred.

It is also preferable for the hydrolyzable group on the silane to be of the same chemical nature as the hydrolyzable group on the crosslinker, ie. if the hydrolyzable groups on the crosslinker are methoxy groups, then it is preferable for the hydrolyzable groups on the silane to be alkoxy groups, although they do not necessarily need to be methoxy groups. Combinations of leaving groups which may give risk to incompatibility or exothermic acid/base reactions should be avoided.

The addition of component (IV) to components (II) and (III) provides improved shelf life for the aminofunctional siloxane. Mixing components (II) and (III) at a molar ratio of (II) to (III) of less than 1 and without addition of component (IV), results in increased viscosity and gelling of the aminofunctional siloxane within 7 to 28 days, the time period depending on the amount of aminofunctional silane added.

Components (II), (III) and (IV) are mixed in varying molar ratios to form the aminofunctional siloxane. Generally, the components are mixed such that the molar ratio of components (II) and (IV) to component (III) is at least 1:1, preferably at least 1.1:1 and the molar ratio of component (IV) to component (II) is between 0 and 2 inclusive. The most preferred molar ratio of component (II) to component (III) is from about 0.2 to 0.8 and the most preferred molar ratio of component (IV) to component (III) is from about 0.2 to 0.8.

The aminofunctional siloxane is formed by mixing components comprising an aminofunctional silane (II) and a hydroxy-endblocked organosiloxane (III) or in a preferred embodiment by mixing components comprising an aminofunctional silane (II), a hydroxy-endblocked organosiloxane and a silane (IV) and in each case allowing them to react. These components may each be added as a single species or as a mixture of two or more different species. The mixing can be done by blending the components together at room temperature or other conventional methods for mixing compounds. The order of mixing is not critical although it is preferred to mix component (III) into component (II) and then mix in component (IV). Components (II), (III) and (IV) can be mixed neat, in solution or in solvent, although it is preferred to add them neat.

The aminofunctional siloxane should not be added to the other ingredients of the silicone emulsion until the reaction between the components is substantially complete. The amount of time necessary for the reaction to be substantially complete depends on the specific compounds used and can be determined experimentally. Typical reaction times range from 5 to 24 hours. If desired, the mixture can be heated in the range of 500° C. to 700° C. which will reduce the reaction time to less than 2 hours.

An effective amount of aminofunctional siloxane is that amount which must be added in order to produce improved adhesion to substrates of the silicone elastomer formed from the silicone emulsion upon the removal of water. The amount of aminofunctional siloxane required depends on the molecular weight of the hydroxy-endblocked organosiloxane. Generally, adding the aminofunctional siloxane in an amount from about 0.10 to 10 parts by weight based on 100 parts by weight diorganosiloxane polymer so to achieve a required minimum concentration of 0.0005 parts by weight of aminofunctionality, preferably a minimum of 0.005 parts by weight of aminofunctionality, in each case based on 100 parts by weight diorganosiloxane polymer, will be effective. As used herein, "parts by weight of aminofunctionality" means the weight percent of primary and secondary amino groups in the aminofunctional siloxane multiplied by the parts by weight of aminofunctional siloxane in the formulation based on 100 parts by weight of diorganosiloxane polymer.

The aminofunctional siloxane may be added before or after emulsification. If the aminofunctional siloxane is added after emulsification, it is preferred that the aminofunctional siloxane be added within 8 hours of the emulsification and more preferably within 2 to 5 hours in order to ensure the adhesive properties of the silicone elastomer obtained upon removal of water are not reduced. For ease of compounding it is preferred to add the aminofunctional siloxane prior to emulsification.

Component (G) is an acid and it is an optional ingredient. It is believed that the acid assists in the incorporation of the aminofunctional siloxane into the emulsion. The acid may be added as a separate ingredient or as part of another component. For example, if dibutyltindiacetate (DBTDA) is used as the tin condensation catalyst, the DBTDA either already contains acetic acid if used in solution or will form acetic acid upon addition to the aqueous emulsion. Any acid may be used in this invention, including but not limited to inorganic acids such as HCl and $H_2SO_4$, and organic acids such as carboxylic acids. Carboxylic acids are preferred because carboxylic acids and their corresponding amine salts also act as a condensation co-catalyst along with the tin condensation catalyst. Examples of carboxylic acids include but are not limited to acetic, formic, propionic and crotonic acids. Acetic acid is the most preferred acid. Since carboxylic acids and their corresponding amine salts act as a co-catalyst, when a carboxylic acid is added, the amount of the tin condensation catalyst that must be added typically may be reduced.

Generally, the acid is added in an amount from about 0.05 to 0.3 parts by weight based on 100 parts by weight diorganosiloxane polymer. Preferably, the acid is added in an amount from about 0.06 to 0.2 parts by weight based on 100 parts by weight diorganosiloxane polymer, with about 0.07 to 0.13 parts by weight based on 100 parts by weight diorganosiloxane polymer being more preferred.

The acid may be added as a single species or as a mixture of two or more different species. The acid may be added before or after emulsification. It is preferred to add the acid prior to crosslinking the diorganosiloxane polymers, therefore before the addition of the tin condensation catalyst and any required crosslinker.

Additional optional ingredients such as fillers and other ingredients may be added with the other components, as desired, to affect certain performance properties of the silicone emulsion or the silicone elastomer formed therefrom. Reinforcing and extending fillers include calcium carbonate, titanium dioxide, zinc oxide, iron oxide or kaolin clay. Fillers which may be used to achieve fire retardency or electrical arc resistance include aluminum trihydrate, fumed titania or zinc borate. Other optional ingredients, including pigments, stabilizers, in-situ reinforcement resins, etc. may also be part of the silicone emulsion.

All of these additional optional ingredients should be tested to ensure that they do not adversely affect the adhesive properties or shelf life of the silicone emulsion or the silicone elastomer formed upon drying the emulsion. The characteristics of the aqueous silicone emulsion and silicone elastomer can be varied to give the desired characteristics by varying these additional optional ingredients.

The particle size of the silicone emulsion does not limit the scope of the present invention as the improved adhesion to substrates occurs without regard to particle size. However, particle size should be such that the silicone emulsion remains stable for a useful length of time, which is usually on the order of several months to several years. Particle sizes of 200 to 1000 nm typically provide this degree of emulsion stability.

The silicone emulsions of this invention may be formed by different methods. For example, the silicone emulsions can be prepared by the process of emulsion polymerization, a process well known to those skilled in the art and taught in U.S. Pat. Nos. 2,891,920, 3,294,725, 3,355,406, 3,360, 491 and 3,697,469 all of which are incorporated herein by reference.

With emulsion polymerization, cyclic or linear siloxane oligomers are dispersed in water with a surfactant to form a premixture. Typically, amphoteric, anionic or cationic surfactants are used or mixtures of amphoteric, cationic or anionic surfactants with nonionic surfactants will also work. The premixture is then mixed at high shear until an emulsion comprising an aqueous phase and a dispersed phase comprising droplets of siloxane oligomers, having particle sizes of between 100–5000 nm, is formed. The mixing can take place in any type of commercial mixing equipment, said mixers being well known to those skilled in the art. To adjust pH, an acid or base may be added to the emulsion or it is added to the premixture. Alternatively, the surfactant may be converted to its acidic or basic form using an ion exchange procedure as taught in U.S. Pat. No. 3,697,469. Although the polymerization will proceed satisfactorily at room temperature, it can be run at elevated temperatures as well, a preferred range being 25° C. to 80° C. The time of polymerization will generally take from 1 to 24 hours depending on the temperature and the desired molecular weight of the polymer. After the diorganosiloxane polymer has reached the desired molecular weight, polymerization is terminated by neutralizing the emulsion.

A crosslinker, if necessary or desired, and a tin condensation catalyst can be added prior to emulsification or after polymerization. Oftentimes, however, the crosslinker and tin condensation catalyst will be added to the emulsion after polymerization is complete. The crosslinker, in this situation, must be capable of migrating from the water into the dispersed phase and still maintain its reactivity.

The aminofunctional siloxane may be added at any time during emulsion polymerization, for example as part of the premixture prior to emulsification or after the premixture is emulsified, either prior to or after polymerization. If the aminofunctional siloxane is added after emulsification, it is preferred to add it within 8 hours.

Additional amounts of water may be also be added at any stage of compounding if a lower polymer solids content is desired. Typical polymer solids content are 20–75%. Preferred polymer solids contents are 40–75%.

The acid may be added after polymerization is complete, separately or as part of another component, ie. for example, DBDTA will form acetic acid upon addition to water.

Any other optional ingredients, such as fillers, pigments, stabilizers, in-situ reinforcement resins, etc. may also be added at any time after the polymerization is complete.

A preferred method for preparing the aqueous silicone emulsions is by a direct emulsification method which is also well known to those skilled in the art and taught for example in U.S. Pat. No. 4,177,177 to Vanderhoff, et al. and pending patent applications, Berg, et al. Ser. No. 430047 filed Apr. 27, 1995 "Elastomers from Silicone Emulsions having Self Catalytic Crosslinkers," Berg, et al., Ser. No. 430776 filed Apr. 27, 1995, "Shelf-Stable Crosslinked Emulsion with Optimum Consistency and Handling without the Use of Thickeners", Joffre, et al. Ser. No. 430772, filed Apr. 27, 1995, "Improved Physical Properties from Silicone Latices through Appropriate Surfactant Selection" each of which is which is hereby incorporated by reference.

With direct emulsification, a mixture of preformed diorganosiloxane polymers, surfactant and water is emulsified at a temperature on the order of 10° C. to 70 ° C. by mixing with sufficient shear for a sufficient period of time. The diorganosiloxane polymers useful in this process are characterized as having a viscosity of greater than 5000 mPa.s but less than 500,000 mPa.s, however, higher molecular weight polymers can be used if the viscosity is adjusted using solvent, polymer blending etc.

Typically, amphoteric, anionic, cationic or non-ionic surfactants are used singly or as mixtures. The mixing can take place in any type of commercial mixing equipment, said mixers being well known to those skilled in the art.

A crosslinker, if necessary or desired, and a tin condensation catalyst can be added prior to emulsification or after emulsification. Oftentimes, however, the crosslinker and tin condensation catalyst will be added before emulsification. If added after emulsification, the crosslinker must be capable of migrating from the water into the dispersed phase and still maintain its reactivity.

The aminofunctional siloxane may be added at any time, for example, prior to or after the emulsification. If the aminofunctional siloxane is added after emulsification, it is preferred to add it within 8 hours of crosslinking the emulsion.

Additional amounts of water may be also be added at any stage of compounding if a lower polymer solids content is desired. Typical polymer solids content are 10–96%. Preferred polymer solids contents are 20–85% with 40–85% being more preferred.

The acid may also be added at any time, separately or as part of another component, ie. for example, DBDTA will form acetic acid upon addition to water. In a preferred method, a carboxylic acid and the aminofunctional siloxane are added before crosslinking. This enables the amount of tin condensation catalyst to be reduced if desired.

Any optional ingredients, such as fillers, pigments, stabilizers, in-situ reinforcement resins, etc. may also be added at any stage of compounding.

In a preferred method, the silicone emulsion is formed by mixing at high shear 100 parts by weight of a diorganosiloxane polymer, wherein X is a hydroxy group, n is 2, Y is Si, and R and $R^1$ are each a methyl radical; 3 parts water; 2 parts of a polyoxyalkylene alkyl ether surfactant; 0.06 parts by weight dibutyltindiacetate catalyst; 1 part by weight of the aminofunctional siloxane which is formed by reacting components comprising the aminofunctional silane (II) $(CH_3O)_3Si-(CH_2)_3-NH-(CH_2)_2-NH_2$, the hydroxy-endblocked organosiloxane (III) $HO-(Si(CH_3)_2)_b-OH$, where b is 7 to 9 and the silane (IV) methyltrimethoxysilane, provided there is 0.005 parts by weight aminofunctionality, and provided further, the molar ratio of component (II) and component (IV) to component (III) is at least 1 and the molar ratio of component (IV) to component (II) is no greater than 2; and 0.1 parts acetic acid to form a high solids emulsion, diluting the high solids emulsion with water as desired and then crosslinking the emulsion by adding 0.8 parts by weight isobutyltrimethoxysilane crosslinker.

The silicone elastomer formed from the silicone emulsion upon the removal of water has improved adhesion to substrates. In addition, the silicone emulsion has a longer shelf life in each case relative to other silicone elastomers from aqueous silicone emulsions.

EXAMPLES

The following examples are presented to further illustrate the compositions of this invention, but are not to be construed as limiting the invention, which is delineated in the appended claims. In the following examples, if not otherwise noted, the wet emulsions were cast into films 1 day after the emulsions were made, and the films were allowed to dry for 7 days prior to testing.

Durometer results were obtained by the method described in ASTM C661 "Indentation Hardness of Elastomeric-Type Sealants by Means of a Durometer". Tensile and elongation results were obtained by the method described in ASTM D412 "Vulcanized Rubber and Thermoplastic Rubbers and Thermoplastic Elastomers—Tension" using dumbbell specimens with an L dimension equal to 1.27 mm. Shore A hardness values were obtained by the method described in ASTM C-661 "Indentation Hardness of Elastomeric Type Sealants by Means of a Durometer."

As used herein, "Me" means methyl, "Et" means ethyl and "laboratory conditions" means a temperature of 23° C.±2 ° C. and 50%±5% relative humidity.

(A) Method for Evaluation of Adhesion

Samples were tooled as 50 mm long and 18 mm wide beads on various substrates. The adhesion was evaluated by under-cutting the bead at the sealant/substrate interface with a razor blade and pulling the bead manually at an angle of about 45° against the horizontal substrate surface. The adhesion was rated "excellent", if the bead failed cohesively. The adhesion was rated "good", if the bead failed adhesively and it took considerable force to remove the bead from the substrate surface. The adhesion was rated "Poor", if the bead failed adhesively at a relatively low peel force.

Example 1

5000 parts of a hydroxy-endblocked polydimethylsiloxane (PDMS) polymer having a viscosity of about 50 Pa.s at 25° C. , 100 parts of Tergitol® TMN-6, a nonionic surfactant ethoxylated trimethylnonanol and 100 parts deionized water were charged to a 10 l Turello mixer.

The mixture was stirred under vacuum for 5 min with the disperser blades rotating at 1,200 rpm. After this mixing, inspection showed a clear, non flowing (thixotropic) gel indicating the formation of a high solids, oil-in-water emulsion. Agitation was begun again with the disperser blades rotating at 600 rpm and 250 parts of deionized water were added. Vacuum was applied and the emulsion was agitated for another two min with the disperser blades rotating at 1,200 rpm. Another inspection found a now milky white emulsion. Agitation was started again with the disperser blades rotating at 600 rpm and 1000 parts of deionized water were added in 2 equal increments. Vacuum was applied, and the mixture stirred for 2 min between additions. A milky white, smooth oil-in-water emulsion was formed, which was free of lumps and gels. To this emulsion, 50 parts of an aminofunctional siloxane (AFF2) which had been obtained by cold blending 74.6 parts of a hydroxy-endblocked PDMS fluid with a degree of polymerization (DP) of about 7 to 9 and a viscosity of 0.04 Pa.s at 25° C. with 15.2 parts of N-(2-aminoethyl)-3-aminopropyltrimethoxysilane and 10.2 parts methyltrimethoxysilane (MTM), were added. Agitation of the mixture was started with the disperser blades rotating at 600 rpm, vacuum applied and the mixture was stirred for 2 min. 40 parts of IBTMS (isobutyltrimethoxysilane) were then added and mixture was stirred for another 2 min under vacuum. Next, 10 parts of DBTDA (dibutyltin diacetate) were added and the mixture was stirred for 2 min under vacuum with the disperser blades rotating at 600 rpm. The crosslinked silicone emulsion was packaged into Semco® cartridges which were centrifuged to remove any trapped air.

After aging the above crosslinked silicone emulsion for 18 hours at room temperature, a sample was tooled into a 2.54 mm [100 mil.] thick film and allowed to cure under laboratory conditions for 7 days. The cured, translucent silicone elastomer had a tensile strength of 0.5 MPa (80 psi), a maximum elongation of 2000%, and a durometer of 10 Shore A. Further samples of the 18 hours aged silicone emulsion were tooled as 50 mm long and 18 mm wide beads onto 16 different substrates and allowed to cure under laboratory conditions for 7 days. One commercially available, calcium carbonate filled silicone latex sealant (Dow Corning® Silicone Plus) and one commercially available, moisture curable RTV alkoxy cure silicone sealant (General Electric GE® II) (non-latex) were evaluated under identical conditions for comparative purposes. Table I summarizes the adhesion results.

TABLE 1

| | Sealant Adhesion | | |
|---|---|---|---|
| Substrate | Example 1 | Silicone Plus | GE II |
| Ceramic Tile | excellent | poor | excellent |
| Duranar | poor | good | good |
| Concrete | excellent | good | good |
| Corian | poor | good | excellent |
| Painted Pine (Alkyd Paint) | excellent | excellent | excellent |
| Painted Pine (Latex Paint) | excellent | excellent | excellent |
| Red Wood | excellent | excellent | excellent |
| Anodized Aluminum | excellent | excellent | excellent |
| Polyvinylchloride (unplasticized) | excellent | good | excellent |
| Glass | excellent | good | excellent |
| Brass | excellent | excellent | excellent |
| Pine | excellent | excellent | excellent |
| Polycarbonate | poor | good | poor |
| Stainless Steel | excellent | excellent | good |
| Mortar | excellent | good | good |
| PMMA (Polymethylmethacrylate) | poor | good | poor |

Example 2

(a) 100 part of a hydroxy-endblocked PDMS polymer having a viscosity of about 50 Pa.s at 25° C. , and 1 part of the aminofunctional siloxane prepared as described in Example 1 (AFF2 ), were charged to a 350 ml Whip Mix pot and the mixture was stirred for 30 seconds under vacuum. 0.06 parts of DBTDA (dibutyltin diacetete) was then added and the mixture was stirred for another 30 sec under vacuum. 0.1 parts of glacial acetic acid were then added and the mixture was stirred for another 30 sec under vacuum. Next, 2 parts of Tergitol® TMN-6, a nonionic surfactant ethoxylated trimethylnonanol and 3 parts deionized water were added and the mixture stirred for another 30 sec under vacuum, yielding a slightly translucent, nonflowable, high solids oil-in-water emulsion. Deionized water was then added in 4 increments of 4 parts each with 30 sec of stirring under vacuum between additions. 0.8 parts IBTMS was added and the mixture stirred for another 30 sec under vacuum. The silicone emulsion was packaged into a Semco® cartridge and centrifuged to remove any trapped air. After aging for 18 hours at room temperature, a sample was tooled into a 2.54 mm [100 mil.] thick film and allowed to cure under laboratory conditions for 7 days. The cured, translucent silicone latex elastomer had a tensile strength of 0.25 MPa (40 psi), a maximum elongation of 1570%, and a durometer of 6 Shore A. Further samples of the 18 hr aged silicone emulsion were tooled as 50 mm long and 18 mm wide beads onto glass, concrete, painted pine and red wood as substrates and allowed to cure under laboratory conditions for 14 days. Adhesion of the silicone latex was evaluated as described in (A) above. The sealant exhibited excellent adhesion (cohesive failure mode) to all the above substrates. Further samples of the silicone emulsion were tested for adhesion as described in (A) above after shelf-aging the wet silicone emulsion under laboratory conditions for 4 wk. The sealant exhibited excellent adhesion (cohesive failure mode) to all the above substrates.

(b) The same procedure was followed as in Example 2(a) above except no aminofunctional siloxane was added. The cured, translucent silicone elastomer had a tensile strength of 0.6 MPa (86 psi), a maximum elongation of 1080%, and a durometer of 11 Shore A. The sealant exhibited poor adhesion on glass and good adhesion concrete, painted pine and red wood. Further samples of the silicone emulsion were tested for adhesion as described in (A) above after shelf-aging the wet silicone emulsion under laboratory conditions for 4 wk. The sealant exhibited poor adhesion on glass and good adhesion on concrete, painted pine and red wood.

(c) This example was prepared according to the procedure of Example 2(a) above except 0.152 parts of 3-aminopropyltriethoxysilane was substituted for the aminofunctional siloxane. The cured, translucent silicone elastomer had a tensile strength of 0.32 MPa (46 psi), a maximum elongation of 1280%, and a durometer of 6 Shore A. The sealant exhibited excellent adhesion (cohesive failure mode) to glass, concrete, painted pine and red wood. Further samples of the silicone emulsion were tested for adhesion as described in (A) above after shelf-aging the wet silicone emulsion under laboratory conditions for 4 wk. The sealant exhibited poor adhesion to glass and good adhesion to concrete, painted pine and red wood.

Example 3

50 parts of a hydroxy-endblocked PDMS polymer having a viscosity of about 50 Pa.s at 25° C., and 0.03 parts of DBTDA were charged to a 100 ml mixer cup and stirred in a Hauschild mixer for 10 sec. Then 0.5 parts of an aminofunctional siloxane prepared as in Example 1 (AFF2) were added, and the mixture was stirred for another 10 seconds in the Hauschild mixer. Then 0.375 parts of IBTMS were added, and the mixture was stirred for another 10 seconds. Then 1 part Tergitol® TMN-6 nonionic surfactant (ethoxylated trimethylnonanol) and 1.5 parts 0.072 molar aqueous solution of glacial acetic acid in deionized water was added and the mixture was stirred for another 10 sec to form a high solids, oil-in-water emulsion. This emulsion was then further diluted by sequential addition of 3, 3, and 4 parts of 0.072 molar acetic acid, with the mixture being stirred for 10 sec on the Hauschild mixer between additions. The silicone emulsion was a milky white material which was transferred into a Semco® cartridge and centrifuged to remove any trapped air. After aging for 18 hr at room temperature, a sample was tooled into a 2.54 mm [100 mil.] thick film and allowed to cure under laboratory conditions for 7 days. The cured, translucent silicone elastomer had a tensile strength of 0.34 MPa (50 psi), a maximum elongation of 1290%, and a durometer of 6 Shore A. Further samples of the 18 hr aged silicone emulsion were tooled as 50 mm long and 18 mm wide beads onto glass, concrete, painted pine and red wood as substrates and allowed to cure under laboratory conditions for 14 days. The sealant exhibited excellent adhesion (cohesive failure mode) to all the substrates tested.

Example 4

Aminofunctional siloxanes having different siloxane chain lengths were prepared by cold blending distilled N-(2-aminoethyl)-3-aminopropyltrimethoxysilane (AEAPTMS), hydroxy-endblocked organosiloxanes (siloxanediols) and MTM in a polyethylene vessel. The mixture was allowed to react for 24 hr, after which time 100% of the hydroxy functionality of the hydroxy-endblocked siloxane had disappeared as determined by gas liquid chromatography (GC). Table 2 shows the ratios, in parts by weight, at which the aminofunctional silane, the siloxanediols of various chain lengths, and the MTM were blended. Each siloxanediol consisted of a distribution of different chain length siloxanediols, their number averaged molecular weight corresponding to a DP of 4, 8, and 39. The mix ratios reported in Table 2 were then calculated assuming the above DPs and a molar ratio of siloxanediol to AEAPTMS to MTM of 0.122 to 0.068 to 0.075.

TABLE 2

| Components (in Parts) | Aminofunctional Siloxanes | | |
|---|---|---|---|
| | AFF1 | AFF2 | AFF3 |
| Siloxanediol DP = 4 | 60.2 | | |
| Siloxanediol DP = 8 | | 74.6 | |
| Siloxanediol DP = 39 | | | 93.3 |
| distilled AEAPTMS | 23.8 | 15.2 | 4 |
| MTM | 16 | 10.2 | 2.7 |

The aminofunctional siloxane (AFF2) is the aminofunctional siloxane used above in Examples 1, 2 and in any other example which includes AFF2.

3 sealant formulations were prepared each using one of these aminofunctional siloxane. The addition level of AFF1 and AFF3 were based on equimolar aminofunctional silane level based on 1 weight part of AFF2 as reference. For each formulation, 100 parts of a hydroxy-endblocked PDMS polymer having a viscosity of about 50 Pa.s at 25 ° C., and either 0.64 parts AFF1, 1 part AFF2 or 3.8 parts AFF3 were charged to a 350 ml Whip Mix mixer and each mixture was stirred for 30 sec under vacuum. To these mixtures 0.06 parts DBTDA and 0.75 parts IBTMS were added and the mixtures stirred for another 30 sec under vacuum. 0.10 parts of glacial acetic acid were then added and the mixtures stirred for another 30 sec under vacuum. Then 2 of Tergitol® TMN-6 nonionic surfactant (ethoxylated trimethylnonanol) and 3 deionized water were added and the mixtures stirred for another 30 sec each forming high solids, oil-in-water emulsions. These emulsions were further diluted by sequential addition of 5 increments of deionized water of 4 parts each with 30 sec of stirring under vacuum between additions. The silicone emulsions were transferred into Semco® cartridges and centrifuged to remove any trapped air. After aging for 18 hr at room temperature, a sample of each formulation was tooled into a 2.54 mm [100 mil.] thick film and allowed to cure under laboratory conditions 7 days. See Table 2(b) for physical property data of the sealant formulations.

TABLE 2(b)

| | Sealant Formulations | | |
|---|---|---|---|
| Physical Properties | S-AFF1 | S-AFF2 | S-AFF3 |
| Tensile (MPa) | 0.41 | 0.28 | 0.35 |
| Max. Elongation (%) | 2570 | 1480 | 730 |
| Shore A Durometer | 2 | 3 | 3 |

Further samples of the 18 hours aged silicone emulsions were tooled as 50 mm long and 18 mm wide beads onto glass and allowed to cure under laboratory conditions for 14 days. All of the sealants exhibited ellcellent adhesion (cohesive failure mode) to the glass.

Example 5

Aminofunctional siloxanes were prepared by cold blending an aminofunctional silane bearing a primary, secondary, or tertiary amino group, a hydroxy-endblocked PDMS (siloxanediol) with a DP of about 7 to 9 and a viscosity of 0.04 Pa.s at 25° C. and MTM in a polyethylene vessel. The mixture was allowed to react for 24 hr, after which time 100% of the —OH functionality of the siloxanediol had disappeared as determined by GC. The following amino-functional silanes were evaluated: (a) aminopropyl triethoxysilane, $H_2N$—$(CH_2)_3Si(OC_2H_5)_3$ (primary amine) (b) N-(2-aminoethyl)-3-aminopropyltrimethoxy silane (primary and secondary amine groups) (c) bis (trimethoxysilylpropyl) amine $(CH_3O)_3Si(CH_2)_3NH(CH_2)_3Si(OCH_3)_3$ (secondary amine) and (d) N-[3-(triethoxysilyl)propyl]-4,5-dihydroimidazole, $(C_2H_5O)_3Si(CH_2)_3$—[N—CH=N—$CH_2$—$CH_2$]—, where the —N—CH=N—$CH_2$—$CH_2$— portion of the molecule is a cyclic radical (tertiary amine). Table 3 shows the ratios, in parts by weight, at which the various aminofunctional silanes, the hydroxy-endblocked siloxane and MTM were blended.

TABLE 3

| Components (in parts) | Aminofunctional Siloxanes | | | |
|---|---|---|---|---|
| | AFF2 | AFF4 | AFF5 | AFF6 |
| Siloxanediol DP = 8 | 74.6 | 74.6 | 69.06 | 72.1 |
| (a) | | 15.2 | | |
| (b) | 15.2 | | | |
| (c) | | | 21.5 | |
| (d) | | | | 18.04 |
| MTM | 10.2 | 10.2 | 9.44 | 9.86 |

*where (a), (b), (c) and (d) are as defined above.

Four sealant formulations were prepared following the procedure of Example 4 above, except each formulation contained 1 part of one of the above aminofunctional siloxanes AFF2, AFF4, AFF5 or AFF6. The silicone emulsions were then packaged and tested for adhesion as described in Example 4. Sealant samples formulated with AFF2 or AFF4 showed cohesive failure mode to glass, while the samples formulated with AFF5 or AFF6 showed adhesive failure mode to glass.

Example 6

Aminofunctional siloxanes were prepared by cold blending N-(2-aminoethyl)-3-aminopropyltrimethoxy silane (AEAPTMS) at half, twice, or triple the molar levels used in AFF2 of Example 4; a hydroxy-endblocked PDMS organosiloxane with a DP of about 7 to 9 and a viscosity of 0.04 Pa.s at 25° C. (siloxanediol); and MTM in a polyethylene vessel. The mixture was allowed to react for 24 hr, after which time 100% of the —OH functionality of the siloxanediol had disappeared as determined by GC. Table 4 shows the compositions of the aminofunctional siloxanes prepared.

TABLE 4

| Components (in parts) | Aminofunctional Siloxanes | | | |
|---|---|---|---|---|
| | AFF2 (1 × molar) | AFF7 (½ × molar) | AFF8 (2 × molar) | AFF9 (3 × molar) |
| Siloxanediol DP = 8 | 74.6 | 80.74 | 64.76 | 57.21 |
| AEAPTMS | 15.2 | 8.23 | 26.39 | 34.97 |
| MTM | 10.2 | 11.03 | 8.85 | 7.82 |

Four sealant formulations were prepared using one of the above aminofunctional siloxanes AFF2, AFF7, AFF8 and AFF9. The addition level of AFF2, AFF7, AFF8 or AFF9 to the silicone emulsion formulations was kept constant at 1 part based on 100 parts PDMS polymer. The sealant formulations were prepared, packaged and tested for adhesion as described in Example 4. Sealant samples formulated with AFF2, AFF8 or AFF9 showed cohesive failure mode to glass, while the sample prepared with AFF7 showed adhesive failure mode to glass.

A further experiment was performed by mixing equal parts of AFF2 and AFF7 to form a 0.75×molar (AFF2/7) and adding 1 part of this blend based on 100 parts of PDMS polymer in a sealant formulation. This sealant, when cured and tested as described above, showed cohesive failure mode to glass. This experiment indicated that the minimum amount of aminofunctionality required in the sealant formulation to obtain cohesive failure mode to glass is $\geq 5 \times 10^{-4}$ parts by weight based on 100 parts of PDMS polymer.

Physical properties were obtained on sealant formulations that were allowed to rest for 18 hr prior to tooling samples into a 2.54 mm [100 mil.] thick films, which then were cured under laboratory conditions for 14 days, Table 5 shows the properties of the various sealant formulations.

TABLE 5

| Properties | Sealant Formulations | | | | |
|---|---|---|---|---|---|
| | S-AFF2 | S-AFF7 | S-AFF8 | S-AFF9 | S-AFF2/7 |
| Adhesion to Glass | cohesive | adhesive | cohesive | cohesive | cohesive |
| Durometer | 5 | 8 | 2 | 0 | 6 |
| Tensile (MPa) | 0.32 | 0.36 | 0.17 | 0.12 | 0.34 |
| Maximum Elongation (%) | 1,280 | 1,480 | 1,840 | 2,480 | 1,290 |

As can be seen from Table 5, an increase in aminofunctional silane content in the aminofunctional siloxane leads to a decrease in durometer and tensile and an increase in the maximum elongation of the sealant. Also, high levels of aminofunctional silane in the sealant formulation (incorporated via the aminofunctional siloxane) can lead to long induction times (up to 10 days) before the sealant will cure upon dry down. High levels of aminofunctional silane, thus, may not be desirable.

In order to determine the stability of the various aminofunctional fluids of this Example 6, 15 g samples of each aminofunctional siloxane were placed in polyethylene bottles, purged with nitrogen, and stored in a 50° C. oven. AFF7, having the lowest amount of aminofunctional silane gelled within 7 days storage. No gellation occurred for the remaining aminofunctional siloxanes over a 30 day storage period.

Example 7

Aminofunctional siloxanes were prepared by cold blending N-(2-aminoethyl)-3-aminopropyltrimethoxy silane (AEAPTMS), 3-aminopropylmethyldiethoxysilane (APMDES) or aminopropyltriethoxysilane (APTES), a hydroxy-endblocked PDMS (siloxanediol) with a DP of about 7 to 9 and a viscosity of 0.04 Pa.s at 25° C., and MTM in a polyethylene vessel. The mixture was allowed to react for 24 hr, after which time 100% of the —OH functionality of the siloxanediol had disappeared as determined by GC. Table 6 shows the compositions of the aminofunctional siloxanes prepared.

TABLE 6

Aminofunctional Siloxanes

| Components (in Parts) | AFF2 | AFF10 | AFF11 |
|---|---|---|---|
| Siloxanediol DP = 8 | 74.6 | 76.2 | 74.67 |
| AEAPTMS | 15.2 | — | — |
| APMDES | — | 13.38 | — |
| APTES | — | — | 15.12 |
| MTM | 10.2 | 10.42 | 10.21 |

AFF2, AFF10 and AFF11 were each evaluated in sealant formulations. In each case the addition level of AFF2, AFF10 or AFF11 was kept constant at 1 part based on 100 parts PDMS polymer. The sealant formulations were prepared, packaged and tested for adhesion as described in Example 4. All sealant samples formulated showed cohesive failure mode to glass.

In order to determine the stability of AFF2, AFF10 and AFF11 of this Example 7, 15 g samples of each aminofunctional siloxane were placed in polyethylene bottles, purged with nitrogen, and stored in a 50° C. oven. AFF10, the aminofunctional siloxane prepared with APMDES gelled within 4 weeks of storage. No gellation occurred with AFF2 and AFF11 over the same storage period.

Example 8

Aminofunctional siloxanes were prepared by cold blending N-(2-aminoethyl)-3-aminopropyltrimethoxy silane (AEAPTMS) at the molar level used for AFF2 in Example 4, a hydroxy-endblocked PDMS organosiloxane (siloxanediol) with a DP of about 7 to 9 and a viscosity of 0.04 Pa.s at 25° C., and an alkoxysilane in a polyethylene vessel. The following alkoxysilanes were used: MTM, tetraethyl orthosilicate (TEOS) and n-propyl orthosilicate (NPOS). The mixtures were allowed to react for 24 hr, after which time 100% of the —OH functionality of the siloxanediol had disappeared as determined by GC. Table 7 shows the composition of each aminofunctional siloxane prepared.

TABLE 7

Aminofunctional Siloxanes

| Components (in parts) | AFF2 | AFF12 | AFF13 |
|---|---|---|---|
| Siloxanediol DP = 8 | 74.6 | 71.59 | 68.07 |
| AEAPTMS | 15.2 | 14.59 | 13.87 |
| MTM | 10.2 | — | — |
| TEOS | — | 13.82 | — |
| NPOS | — | — | 18.06 |

AFF2, AFF12 and AFF13 were each evaluated in sealant formulations. In each case the addition level of AFF2, AFF12 or AFF13 was kept constant at 1 part based on 100 parts PDMS polymer. The sealant formulations were prepared, packaged and tested for adhesion as described in Example 4. All sealant samples formulated showed cohesive failure mode to glass. The sealants were also tested for freeze/thaw stability and were found to pass 10 ASTM freeze/thaw cycles.

Example 9

An aminofunctional siloxane was prepared by cold blending N-(2-aminoethyl)-3-aminopropyltrimethoxy silane (AEAPTMS) at the molar level used for AFF2 in Example 4, a hydroxy-endblocked PDMS organosiloxane (siloxanediol) with a DP of about 7 to 9 and a viscosity of 0.04 Pa.s at 25° C., and a mixture containing various alkoxyoximosilanes in a polyethylene vessel. The alkoxyoximosilane mixture contains about 3% tetra (methylethylketoximo)silane (TOS), about 84% of tri and dioximo silane, about 10% mono oximosilane, where the other groups on the molecule are ethoxy groups and about 2% methylethylketoxime solvent. The mixture was allowed to react for 24 hr, after which time 100% of the —OH functionality of the siloxanediol had disappeared as determined by GC. AFF2 was also prepared. Table 8 shows the composition of the aminofunctional siloxanes prepared.

TABLE 8

Aminofunctional Siloxanes

| Aminofunctional Siloxane Components (in parts) | AFF2 | AFF14 |
|---|---|---|
| Siloxanediol DP = 8 | 74.6 | 67.88 |
| AEAPTMS | 15.2 | 13.83 |
| MTM | 10.2 | — |
| TOS | — | 18.19 |

AFF2 and AFF14 were each evaluated in sealant formulations. In each case the addition level of AFF2 or AFF14 was kept constant at 1 part based on 100 parts PDMS polymer. The sealant formulations were prepared, packaged and tested as described in Example 4. All sealant samples formulated showed cohesive failure mode to glass. The sealants were also tested for freeze/thaw stability and were found to pass 10 ASTM freeze/thaw cycles.

Example 10

The following cold blends were prepared in a polyethylene vessel and allowed to react for 24 hours to evaluate the effects of binary mixture of the components comprising the aminofunctional siloxanes:

(a) a hydroxy-endblocked PDMS organosiloxane (siloxanediol) with a DP of about 7 to 9 and a viscosity of 0.04 Pa.s at 25° C. blended with N-(2-aminoethyl) -3-aminopropyltrimethoxy silane (AEAPTMS);

(b) a hydroxy-endblocked PDMS organosiloxane (siloxanediol) with a DP of about 7 to 9 and a viscosity of 0.04 Pa.s at 25° C. blended with MTM; and (c) MTM blended with N-(2-aminoethyl)-3-aminopropyltrimethoxy silane (AEAPTMS).

Table 9 shows the composition of the various functional fluids prepared.

TABLE 9

Functional Fluids

| Components (in parts) | AFF15 (a) | F1 (b) | AFF16 (c) |
|---|---|---|---|
| Siloxanediol DP = 8 | 83.07 | 87.97 | — |
| AEAPTMS | 16.93 | — | 59.84 |
| MTM | — | 12.03 | 40.16 |

GC analysis of the functional fluids showed that (b) the MTM and siloxanediol did not react. Three sealant formulations were prepared, each utilizing one of the functional fluids were evaluated.

For each formulation, 200 parts of a hydroxy-endblocked PDMS polymer having a viscosity of about 50 Pa.s at 25° C., 4 parts of Tergitol® TMN-6 nonionic surfactant (ethoxylated trimethylnonanol) and 4 parts deionized water were charged to 350 ml Whip Mix mixers and the mixtures stirred for 30 sec under vacuum. To these high solids emulsion were added 50 parts of deionized water in five increments of 10 parts each, with 30 sec of stirring between additions. To these dilute emulsions, either 1.8 parts AFF15 (a), 1.7 parts F1 (b) or 0.51 parts AFF16 (c), these amounts providing the molar equivalency of 2 parts AFF2, was added as well as 1.6 parts IBTMS and 0.4 parts DBTDA and the mixtures were stirred for another 30 sec under vacuum. The silicone emulsions were packaged and tested for adhesion as described in Example 4. The sealant samples prepared with AFF15 (a) showed cohesive failure to glass, while the samples prepared with F1 (b) or AFF16 (c) failed adhesively to glass. Physical properties of the sealants are shown in Table 10.

TABLE 10

Sealant Formulations

| Physical Properties | S-AFF15 | S-F1 | S-AFF16 |
| --- | --- | --- | --- |
| Glass Adhesion | cohesive | adhesive | adhesive |
| Durometer (Shore A) | 6 | 12 | 10 |
| Tensile Strength (MPa) | 0.47 | 0.65 | 0.55 |
| Maximum Elongation (%) | 1600 | 880 | 1,280 |

In order to determine the stability of the various functional fluids, 15 g samples of each fluid were placed in polyethylene bottles, purged with nitrogen, and stored in a 50° C. oven. AFF15, the aminofunctional siloxane prepared without MTM gelled within 4 weeks of storage. No gellation occurred with F1 and AFF16 over the same storage period.

Example 11

Aminofunctional siloxanes were prepared by cold blending a hydroxy-endblocked PDMS organosiloxane (siloxanediol) with a DP of about 7 to 9 and a viscosity of 0.04 Pa.s at 25° C., MTM and a functional organosilane in a polyethylene vessel and allowing the mixture to react for 24 hours. The following functional organosilanes were used (a) N-(2-aminoethyl)-3-aminopropyltrimethoxy silane (AEAPTMS), (b) gamma-glycidoxypropyl trimethoxysilane (GPTMS), (c) gamma-methacryloxypropyl trimethoxysilane (MAPTMS) and (d) gamma-mercaptopropyl trimethoxysilane (MPTMS). The various functional organosilanes were added in the cold blend at a constant molar ratio. Table 11 shows the composition of the various functional fluids.

TABLE 11

Functional Fluids

| Components (in parts) | AFF2 (a) | F2 (b) | F3 (c) | F4 (d) |
| --- | --- | --- | --- | --- |
| Siloxanediol DP = 8 | 74.6 | 74.6 | 74.6 | 74.6 |
| AEAPTMS | 15.2 | — | — | — |
| GPTMS | — | 16.2 | — | — |
| MAPTMS | — | — | 17 | — |
| MPTMS | — | — | — | 13.4 |
| MTM | 10.2 | 10.2 | 10.2 | 10.2 |

Each of these functional fluids were evaluated in sealant formulations. The addition level of functional fluids to the silicone latex formulation was kept constant at 1 part based on 100 parts PDMS polymer. The sealant formulations were prepared, packaged and tested as described in Example 4. The sealant samples prepared with AFF2 (a) showed cohesive failure to glass, while the samples prepared with F2 (b), F3 (c) or F4 (d) showed adhesive failure to glass.

Example 12

Aminofunctional siloxanes were prepared by cold blending N-(2-aminoethyl)-3-aminopropyltrimethoxy silane (AEAPTMS), MTM, and a hydroxy-endblocked organosiloxane in a polyethylene vessel. The following hydroxy-endblocked organosiloxanes (siloxanediol) were used: (a) a PDMS organosiloxane with a DP of about 7 to 9 and a viscosity of 0.04 Pa.s at 25° C. as described in Example 1, (b) polyphenylmethylsiloxane organosiloxane with an average DP of 5–7 and an average —OH content of 6.55%, and (c) polytrifluoropropylmethyl organosiloxane with an average DP of 5–7 and an average —OH content of 6.10%. The mixtures were allowed to react for 24 hr, after which time 100% of the —OH functionality of the hydroxy-endblocked organosiloxane had disappeared as determined by GC. Table 12 shows the compositions of the various aminofunctional siloxane prepared.

TABLE 12

Aminofunctional Siloxanes

| Components (in parts) | AFF2 | AFF17 | AFF18 |
| --- | --- | --- | --- |
| Dimethylsiloxanediol | 74.6 | — | — |
| Phenylmethylsiloxanediol | — | 64.77 | — |
| Trifluoropropylmethylsiloxanediol | — | — | 66.38 |
| AEAPTMS | 15.2 | 21.08 | 20.12 |
| MTM | 10.2 | 14.05 | 13.5 |

Each of these aminofunctional siloxanes were evaluated in sealant formulations. The addition level of aminofunctional siloxane to the formulation was kept constant at 1 part based on 100 parts PDMS polymer. The sealant formulations were prepared, packaged and tested as described in Example 4. The sealant sample prepared with AFF2 (a) showed cohesive failure to glass, wood and concrete and mixed failure mode (50% cohesive) on mill finished aluminum. The sealant samples prepared with AFF17 or AFF18 showed adhesive failure to glass and mill finished aluminum, and cohesive failure to wood and concrete. The physical properties of all sealant samples were quite comparable with durometers being in the 4–5 Shore A range, tensile strengths ranging from 0.34 to 0.37 MPa, and maximum elongations ranging from 2060% to 2300%.

Example 13

(a) In order to demonstrate the stability of a premixture consisting of an aminofunctional siloxane (AFF2), IBTMS, hydroxy-endblocked diorganosiloxane polymer, and DBTDA, the following experiment was undertaken. The premixture was prepared as follows: 5000 parts of an hydroxy-endblocked PDMS polymer having a viscosity of about 50 Pa.s at 25° C. and 50 parts of AFF2 were charged to a 10 l Turello mixer. The mixture was stirred for 30 sec under vacuum. To this mixture 40 parts of IBTMS and 3 parts of DSTDA were added and the mixture was stirred for another 30 sec under vacuum. The viscosity of the mixture was monitored and no significant increase in viscosity was observed over a period of four hours. 104 g samples of this premixture were taken at 60 min intervals and charged to a 350 ml Whip Mixer. To each of these samples, 2 parts of Tergitol® TMN-6 nonionic surfactant and 2 parts deionized water was added and the mixture stirred for 30 sec under vacuum yielding a slightly translucent, non flowable, high solids oil-in-water emulsion. Deionized water was then added in four increments of 4 parts each with 30 sec of stirring under vacuum between additions. The samples taken from premixture after 1, 2, 3 and 4 hours emulsified without any problems, and the resulting sealants showed cohesive failure on glass.

(b) Another experiment was performed to evaluate how long after emulsification the aminofunctional siloxane could be added. 5000 parts of an hydroxy-endblocked PDMS polymer having a viscosity of about 50 Pa.s at 25° C., 40 parts of IBTMS and 3 parts of DBTDA were added and the mixture was stirred for 30 sec under vacuum. To this mixture was added 100 parts of Tergitol®0 TMN-6 and the mixture stirred another 30 sec under vacuum. 150 parts deionized water was then added and the mixture stirred for 5 min under vacuum yielding a slightly translucent, non flowable, high solids oil-in-water emulsion. 106 g samples of this silicone latex dispersion were taken in regular intervals of 60 min. The samples were charged to a 350 ml Whip Mixer and 1 part of AFF2 was added. The mixture was stirred under vacuum for 30 sec. To this high solids silicone emulsion deionized water was added in four increments of 4 parts each with 30 sec of stirring under vacuum between additions. It was found that the aminofunctional siloxane could be added up to 8 hr (inclusive) after emulsification of all other sealant components and still provide cohesive failure mode of the cured sealant to glass.

Example 14

95.67 parts of a hydroxy-endblocked PDMS polymer having a viscosity of about 50 Pa.s at 25° C., and 0.06 parts of DBTDA were charged to a 350 ml Whip Mix pot and the mixture was stirred for 30 sec under vacuum. To this mixture was added 0.93 parts of AFF2 and the mixture was stirred for another 30 sec under vacuum. 0.08 parts of glacial acetic acid were then added and this mixture was stirred for another 30 sec under vacuum. To this mixture were added 0.70 parts IBTMS and the mixture was stirred for another 30 sec under vacuum. To this mixture were added 2.06 parts of Tergitol® TMN-6, nonionic surfactant (ethoxylated trimethylnonanol) and 2.32 parts deionized water, and the mixture was stirred for another 30 sec under vacuum, yielding a slightly translucent, non flowable, high solids oil-in-water emulsion. To this mixture were added 66.28 parts of a 70% solids dispersion of kaolin clay in water and 44.9 parts of a 62% solids dispersion of rutile titanium dioxide in water and the mixture was stirred for another 30 sec under vacuum. The silicone emulsion was packaged into a Semco® cartridge and centrifuged to remove any trapped air. After aging the silicone emulsion for 18 hr at room temperature, a sample was tooled into a 2.54 mm [100 mil.] thick film and allowed to cure under laboratory conditions for 14 days. The silicone elastomer had a tensile strength of 0.64 MPa (92 psi), a maximum elongation of 640%, and a durometer of 22 Shore A. Further samples of the 18 hr aged silicone emulsion were tooled as 50 mm long and 18 mm wide beads onto glass, concrete, painted pine and red wood as substrates and allowed to cure under laboratory conditions for 14 days. The sealant exhibited excellent adhesion (cohesive failure mode) to all the above substrates.

We claim:

1. An aqueous silicone emulsion which forms a silicone elastomer upon the removal of water having improved adhesion to substrates, the silicone emulsion comprising the product formed by mixing:

(A) a diorganosiloxane polymer (I) having the general formula $$X_{3-n}R_n—YO—(R^1{}_2SiO)_z—Y—R_nX_{3-n}$$

where n is 0, 1, 2 or 3, z is an integer from 200 to 10,000,

X is a hydroxyl group or any hydrolyzable group,

R is individually selected from the group consisting of substituted and unsubstituted monovalent hydrocarbon radicals having from 1–15 carbon atoms, $R^1$ is individually selected from the group consisting of X groups and R groups, provided, at least 90% of the $R^1$ groups are R groups, and Y is a Si atom, a —Si—$(CH_2)_m$SiR$^1{}_2$— group or a —Si—$(CH_2)_m$SiR$^1{}_2$—O—SiR$^1{}_2$—$(CH_2)_m$SiR$^1{}_2$— group, where $R^1$ is defined above and m is a positive integer;

(B) water;

(C) a surfactant;

(D) optionally, a crosslinker;

(E) a tin condensation catalyst;

(F) an effective amount of an aminofunctional siloxane which is formed by reacting components comprising an aminofunctional silane (II) having the formula $$A_3Si(CH_2)_p—(Z—(CH_2)_q)_rNR^3{}_2$$

where, A is a hydrolyzable group, Z is an oxygen atom or $NR^2$, where $R^2$ is individually selected from the group consisting of hydrogen and substituted and unsubstituted monovalent hydrocarbon radicals having from 1–15 carbon atoms, $R^3$ is individually selected from the group consisting of hydrogen and substituted and unsubstituted monovalent hydrocarbon radicals having from 1–15 carbon atoms, p and q are each a integer from 2 to 10 and r is a positive integer from 0 to 3; a hydroxy-endblocked organosiloxane (III) having the formula $$HO—(SiR^4{}_2)_b—OH$$

where $R^4$ is individually selected from the group consisting of substituted and unsubstituted monovalent hydrocarbon radicals having from 1–15 carbon atoms and b is a positive integer from 4 to 80; and a silane (IV) having the formula $$R^5{}_cSiG_{4-c}$$

where $R^5$ is individually selected from the group consisting of substituted and unsubstituted monovalent hydrocarbon radicals having from 1–15 carbon atoms, G is a hydrolyzable group and c is 0, 1 or 2; and (G) optionally, an acid.

2. The silicone emulsion of claim 1, comprising 100 parts by weight diorganosiloxane polymer; 8 to 1000 parts by weight water; 0.1 to 10 parts by weight surfactant; 0.01 to 5 parts by weight tin condensation catalyst and from 0.1 to 10 parts by weight aminofunctional siloxane provided that there is at least 0.0005 parts by weight aminofunctionality and provided further that the molar ratio of component (II) to component (III) is at least 1.

3. The silicone emulsion of claim 1, comprising 100 parts by weight diorganosiloxane polymer; 8 to 1000 parts by weight water; 0.1 to 10 parts by weight surfactant; 0.01 to 5 parts by weight tin condensation catalyst and from 0.1 to 10 parts by weight aminofunctional siloxane, provided that there is at least 0.0005 parts by weight aminofunctionality and provided further that the molar ratio of components (II) and (IV) to component (III) is at least 1 and the molar ratio of component (IV) to component (II) is between 0 and 2 inclusive.

4. The silicone emulsion of claim 2, wherein R and $R^1$ are each methyl radicals, Y is Si, n is 0, 1 or 2, X is hydroxyl, methoxy or ethoxy; the surfactant is selected from the group consisting of anionic surfactants, nonionic surfactants and mixtures thereof; the tin condensation catalyst is a stannic tin (IV) compound; and comprising 0.1 to 50 parts of a silane crosslinker having at least 3 alkoxy groups and 0.05 to 0.3 parts by weight of an organic acid.

5. The silicone emulsion of claim 3, wherein R and $R^1$ are each methyl radicals, Y is Si, n is 0, 1 or 2, X is hydroxyl, methoxy or ethoxy; the surfactant is selected from the group consisting of anionic surfactants, nonionic surfactants and mixtures thereof; the tin condensation catalyst is a stannic tin (IV) compound; and comprising 0.1 to 50 parts of a silane crosslinker having at least 3 alkoxy groups and 0.05 to 0.3 parts by weight of an organic acid.

6. The silicone emulsion of claim 5, wherein n is 2 and X is hydroxyl; and comprising 15 to 50 parts by weight based on 100 parts by weight diorganosiloxane polymer of water; 0.05 to 5 parts by weight based on 100 parts by weight diorganosiloxane polymer of a surfactant selected from the group consisting of nonionic and mixtures of nonionic and anionic surfactants; 1 to 10 parts by weight based on 100 parts by weight diorganosiloxane polymer of the alkoxysilane crosslinker wherein each alkoxy group has up to 8 carbon atoms; 0.05 to 2 parts by weight based on 100 parts by weight diorganosiloxane polymer of a tin (IV) carboxylate catalyst; the aminofunctional siloxane which is formed by reacting components comprising the aminofunctional silane (II), where A is an alkoxy group, Z is $NR^2$ where $R^2$ is hydrogen, $R^3$ is a hydrogen, p and q are each integers from 2 to 6 and r is an integer from 0 to 2, the hydroxy-endblocked organosiloxane (III), where $R^4$ is methyl and b is 4 to 50 and silane (IV) where $R^5$ is a methyl group, c is 0 or 1 and G is an alkoxy group; and 0.06 to 0.2 parts by weight based on 100 parts by weight diorganosiloxane polymer of a carboxylic acid.

7. The silicone emulsion of claim 6, wherein the alkoxy groups of A have up to 8 carbon atoms and G is a methoxy or ethoxy group.

8. The silicone emulsion of claim 6, comprising 1.5 to 5 parts by weight based on 100 parts by weight diorganosiloxane polymer of a polyoxyalkylene alkyl ether surfactant; 2 to 5 parts by weight based on 100 parts by weight diorganosiloxane polymer of the alkoxysilane crosslinker wherein each alkoxy group has up to 3 carbon atoms; 0.06 to 0.5 parts by weight based on 100 parts by weight diorganosiloxane polymer of a dibutyltindiacetate catalyst; the aminofunctional siloxane which is formed by reacting components comprising the aminofunctional silane (II), where in A each alkoxy group has up to 3 carbon atoms, p is 3, q is 2 and r is 0 or 1, the hydroxy-endblocked organosiloxane (III), where b is 6 to 20 and silane (IV) where c is 1 and G is a methoxy group provided that there is at least 0.005 parts by weight aminofunctionality based on 100 parts by weight diorganosiloxane polymer and provided further that the molar ratio of component (II) to component (III) is 0.2 to 0.8, the molar ratio of component (IV) to component (III) is 0.2 to 0.8, the molar ratio of component (II) and component (IV) to (III) is at least 1.1 and the molar ratio of (IV) to (II) is between 0 and 2 inclusive; and 0.07 to 0.13 parts by weight based on 100 parts by weight diorganosiloxane polymer of acetic acid.

9. A method of preparing an aqueous silicone emulsion which forms a silicone elastomer upon the removal of water having improved adhesion to substrates comprising the step of mixing:

(A) a diorganosiloxane polymer (I) having the general formula

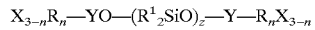

where
n is 0, 1, 2 or 3,
z is an integer from 200 to 10,000,
X is a hydroxyl group or any hydrolyzable group,
R is individually selected from the group consisting of substituted and unsubstituted monovalent hydrocarbon radicals having from 1–15 carbon atoms,
$R^1$ is individually selected from the group consisting of X groups and R groups, provided, at least 90% of the $R^3$ groups are R groups, and
Y is a Si atom, a $—Si—(CH_2)_m SiR^1{}_2—$ group or a $—Si—(CH_2)_m SiR^1{}_2—O—SiR^1{}_2—(CH_2)_m SiR^1{}_2—$ group, where $R^1$ is defined above and m is a positive integer;

(B) water;

(C) a surfactant;

(D) optionally, a crosslinker;

(E) a tin condensation catalyst;

(F) an effective amount of an aminofunctional siloxane which is formed by reacting components comprising an aminofunctional silane (II) having the formula

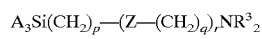

where, A is a hydrolyzable group, Z is an oxygen atom or $NR^2$, where $R^2$ is individually selected from the group consisting of hydrogen and substituted and unsubstituted monovalent hydrocarbon radicals having from 1–15 carbon atoms, $R^3$ is individually selected from the group consisting of hydrogen and substituted and unsubstituted monovalent hydrocarbon radicals having from 1–15 carbon atoms, p and q are each a integer from 2 to 10 and r is a positive integer from 0 to 3; a hydroxy-endblocked organosiloxane (III) having the formula

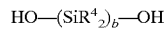

where $R^4$ is individually selected from the group consisting of substituted and unsubstituted monovalent hydrocarbon radicals having from 1–15 carbon atoms and b is a positive integer from 4 to 80; and a silane (IV) having the formula

where $R^5$ is individually selected from the group consisting of substituted and unsubstituted monovalent hydrocarbon radicals having from 1–15 carbon atoms, G is a hydrolyzable group and c is 0, 1 or 2; and (G) optionally, an acid, forming a silicone elastomer upon the removal of water having improved adhesion to substrates.

10. The method of claim 9, comprising 100 parts by weight diorganosiloxane polymer; 8 to 1000 parts by weight water; 0.1 to 10 parts by weight surfactant; 0.01 to 5 parts by weight tin condensation catalyst and from 0.1 to 10 parts by weight aminofunctional siloxane provided that there is at least 0.0005 parts by weight aminofunctionality and provided further that the molar ratio of component (II) to component (III) is at least 1.

11. The method of claim 9, comprising 100 parts by weight diorganosiloxane polymer; 8 to 1000 parts by weight water; 0.1 to 10 parts by weight surfactant; 0.01 to 5 parts by weight tin condensation catalyst and from 0.1 to 10 parts by weight aminofunctional siloxane, provided that there is at least 0.0005 parts by weight aminofunctionality and provided further that the molar ratio of components (II) and (IV) to component (III) is at least 1 and the molar ratio of component (IV) to component (II) is between 0 and 2 inclusive.

12. The method of claim 10, wherein R and $R^1$ are each methyl radicals, Y is Si, n is 0, 1 or 2, X is hydroxyl, methoxy or ethoxy; the surfactant is selected from the group consisting of anionic surfactants, nonionic surfactants and mixtures thereof; the tin condensation catalyst is a stannic tin (IV) compound; and comprising 0.1 to 50 parts of a silane crosslinker having at least 3 alkoxy groups and 0.05 to 0.3 parts by weight of an organic acid.

13. The method claim 11, wherein R and $R^1$ are each methyl radicals, Y is Si, n is 0, 1 or 2, X is hydroxyl, methoxy or ethoxy; the surfactant is selected from the group consisting of anionic surfactants, nonionic surfactants and mixtures thereof; the tin condensation catalyst is a stannic tin (IV) compound; and comprising 0.1 to 50 parts of a silane crosslinker having at least 3 alkoxy groups and 0.05 to 0.3 parts by weight of an organic acid.

14. The method of claim 13, wherein n is 2 and X is hydroxyl; and comprising 15 to 50 parts by weight based on 100 parts by weight diorganosiloxane polymer of water; 0.05 to 5 parts by weight based on 100 parts by weight diorganosiloxane polymer of a surfactant selected from the group consisting of nonionic and mixtures of nonionic and anionic surfactants; 1 to 10 parts by weight based on 100 parts by weight diorganosiloxane polymer of the alkoxysilane crosslinker wherein each alkoxy group has up to 8 carbon atoms; 0.05 to 2 parts by weight based on 100 parts by weight diorganosiloxane polymer of a tin (IV) catalyst; the aminofunctional siloxane which is formed by reacting components comprising the aminofunctional silane (II), where A is an alkoxy group, Z is $NR^2$ where $R^2$ is hydrogen, $R^3$ is a hydrogen, p and q are each integers from 2 to 6 and r is an integer from 0 to 2, the hydroxy-endblocked organosiloxane (III), where $R^4$ is methyl and b is 4 to 50 and silane (IV) where $R^5$ is a methyl group, c is 0 or 1 and G is an alkoxy group; and 0.06 to 0.2 parts by weight based on 100 parts by weight diorganosiloxane polymer of a carboxylic acid.

15. The method of claim 14, wherein the alkoxy groups of A have up to 8 carbon atoms and G is a methoxy or ethoxy group.

16. The method of claim 14, comprising 1.5 to 5 parts by weight based on 100 parts by weight diorganosiloxane polymer of a polyoxyalkylene alkyl ether surfactant; 2 to 5 parts by weight based on 100 parts by weight diorganosiloxane polymer of the alkoxysilane crosslinker wherein each alkoxy group has up to 3 carbon atoms; 0.06 to 0.5 parts by weight based on 100 parts by weight diorganosiloxane polymer of a dibutyltindiacetate catalyst; the aminofunctional siloxane which is formed by reacting components comprising the aminofunctional silane (II), where in A each alkoxy group has up to 3 carbon atoms, p is 3, q is 2 and r is 0 or 1, the hydroxy-endblocked organosiloxane (III), where b is 6 to 20 and silane (IV) where c is 1 and G is a methoxy group provided that there is at least 0.005 parts by weight aminofunctionality based on 100 parts by weight diorganosiloxane polymer and provided further that the molar ratio of component (II) to component (III) is 0.2 to 0.8, the molar ratio of component (IV) to component (III) is 0.2 to 0.8, the molar ratio of component (II) and component (IV) to (III) is at least 1.1 and the molar ratio of (IV) to (II) is between 0 and 2 inclusive; and 0.07 to 0.13 parts by weight based on 100 parts by weight diorganosiloxane polymer of acetic acid.

17. The method of claim 9 comprising mixing at high shear 100 parts by weight of a diorganosiloxane polymer, wherein X is a hydroxy group, n is 2, Y is Si, and R and $R^1$ are each a methyl radical; 3 parts water; 2 parts of a polyoxyalkylene alkyl ether surfactant; 0.06 parts by weight dibutyltindiacetate catalyst; 1 part by weight of the aminofunctional siloxane which is formed by reacting components comprising the aminofunctional silane (II) $(CH_3O)_3Si$—$(CH_2)_3$—NH—$(CH_2)_2$—$NH_2$, the hydroxy-endblocked organosiloxane (III) HO—$(Si(CH_3)_2)_b$—OH, where b is 7 to 9 and the silane (IV) methyltrimethoxysilane, provided there is 0.005 parts by weight aminofunctionality, and provided further, the molar ratio of component (II) and component (IV) to component (III) is at least 1 and the molar ratio of component (IV) to component (II) is no greater than 2; and 0.1 parts acetic acid to form a high solids emulsion, diluting the high solids emulsion with water as desired and then crosslinking the emulsion by adding 0.8 parts by weight isobutyltrimethoxysilane crosslinker.

18. The composition produced by the method of claim 17.

* * * * *